United States Patent
Danielsson

(10) Patent No.: US 8,696,269 B2
(45) Date of Patent: Apr. 15, 2014

(54) DRILL BODY AS WELL AS SUPPORT PAD THEREFOR

(75) Inventor: Åke Danielsson, Torsåker (SE)

(73) Assignee: Sandvik Intellectual Property AB, Sandviken (SE)

( * ) Notice: Subject to any disclaimer, the term of this patent is extended or adjusted under 35 U.S.C. 154(b) by 1129 days.

(21) Appl. No.: 12/640,213

(22) Filed: Dec. 17, 2009

(65) Prior Publication Data

US 2010/0158623 A1  Jun. 24, 2010

(30) Foreign Application Priority Data

Dec. 19, 2008 (SE) .................................. 0850157

(51) Int. Cl.
*B23B 51/00* (2006.01)

(52) U.S. Cl.
USPC ............................... 408/83; 408/200; 408/705

(58) Field of Classification Search
USPC ........... 408/79, 80, 81, 82, 83, 200, 223, 224, 408/705
See application file for complete search history.

(56) References Cited

U.S. PATENT DOCUMENTS

| | | | |
|---|---|---|---|
| 3,751,177 A * | 8/1973 | Faber | 408/200 |
| 4,571,130 A | 2/1986 | Kress et al. | |
| 4,596,498 A | 6/1986 | Kress | |
| 5,551,812 A | 9/1996 | Basteck | |
| 5,697,737 A | 12/1997 | Danielsson et al. | |
| 6,602,028 B1 | 8/2003 | Lindblom et al. | |
| 6,682,275 B1 | 1/2004 | Lindblom et al. | |
| 2006/0045640 A1 * | 3/2006 | Hessman | 408/81 |
| 2007/0092347 A1 * | 4/2007 | Ananolli | 408/81 |
| 2010/0040425 A1 | 2/2010 | Nomura et al. | |

FOREIGN PATENT DOCUMENTS

| | | | | |
|---|---|---|---|---|
| JP | 2003211311 A | * | 7/2003 | ............. B23B 51/00 |
| JP | 2005103701 A | * | 4/2005 | ............. B23B 51/06 |
| JP | 2006239827 A | * | 9/2006 | ............. B23B 51/00 |
| JP | 2008254089 A | * | 10/2008 | ............. B23B 51/00 |

OTHER PUBLICATIONS

Notification of the Second Office Action (with English translation) for Chinese Patent Application No. 200910254100.6, dated Sep. 13, 2013.
English translation for Notice of Reasons for Rejection for Japanese Patent Application No. 2009-287989, dated Oct. 15, 2013.

* cited by examiner

*Primary Examiner* — Daniel Howell
*Assistant Examiner* — Michael Vitale
(74) *Attorney, Agent, or Firm* — Morgan, Lewis & Bockius LLP

(57) ABSTRACT

A support pad intended for metal machining drills and of the type that includes an outer surface, an inner surface, front and rear end surfaces, as well as a pair of spaced-apart side surfaces, between the outer surface and at least the front end surface a convexly arched entering surface being formed that extends between, on one hand, a pair of front and rear borderlines, the rear one of which borders the outer surface, and, on the other hand, two tangentially spaced-apart side borderlines. The rear borderline of the entering surface has the shape of a convex arc line as viewed in planar view toward the outer surface, more precisely an arc line the crest of which is facing forward. In such a way, the position of the contact of the support pad with a hole wall can be predetermined in an exact way. The drill body may be equipped with one or more support pads.

22 Claims, 8 Drawing Sheets

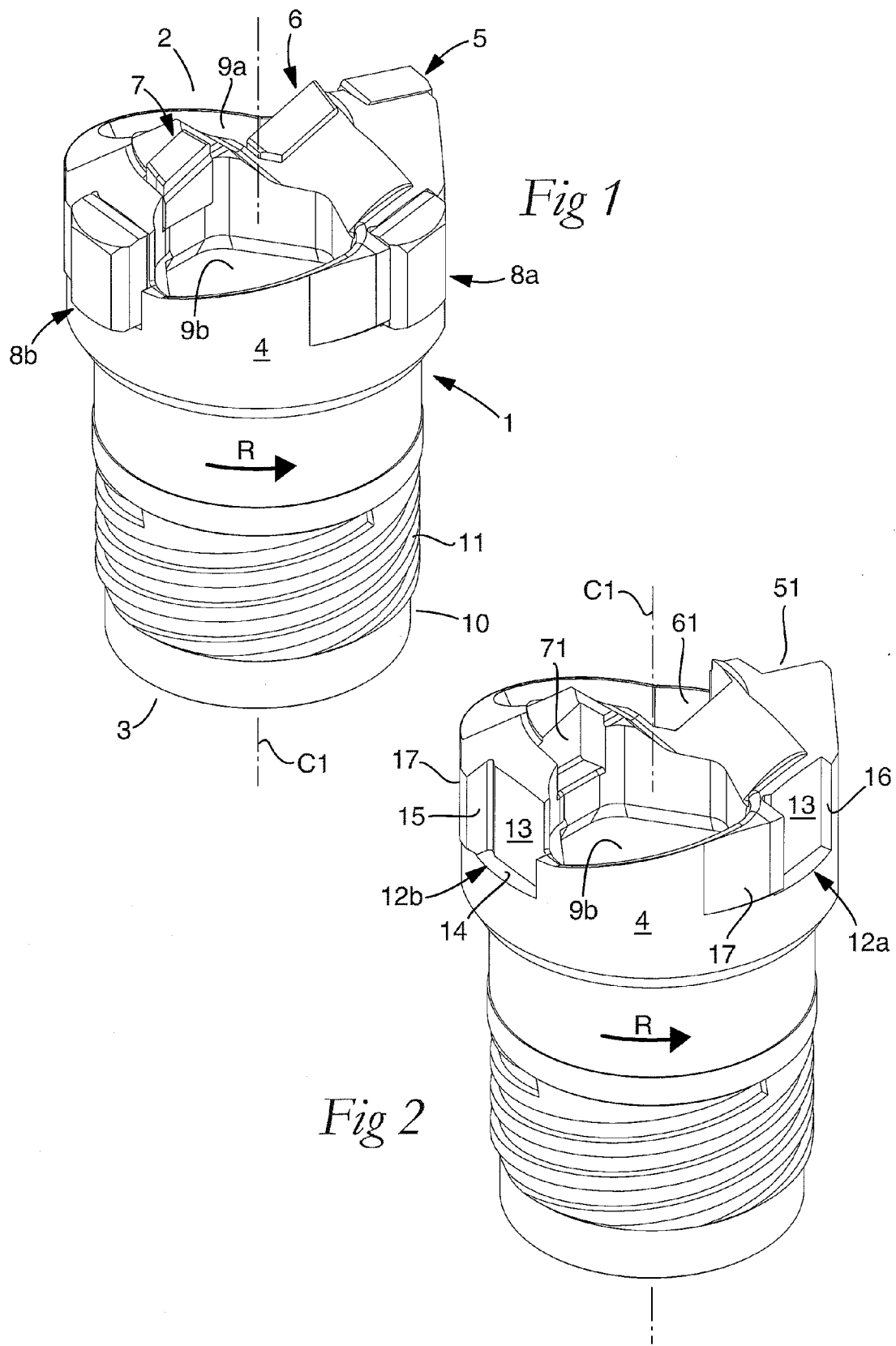

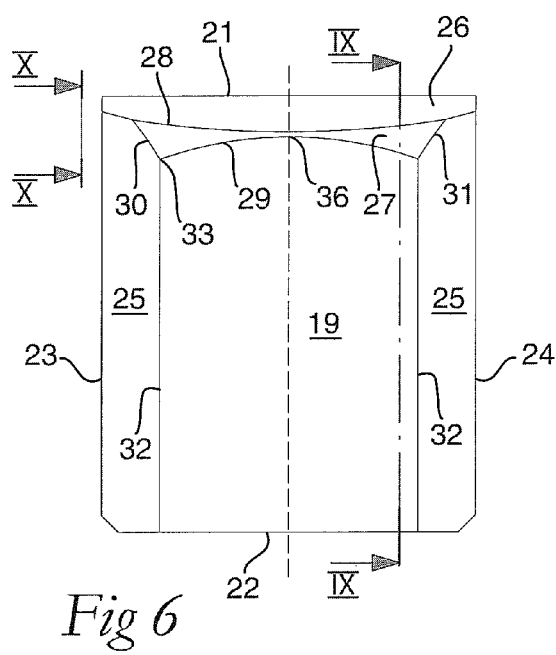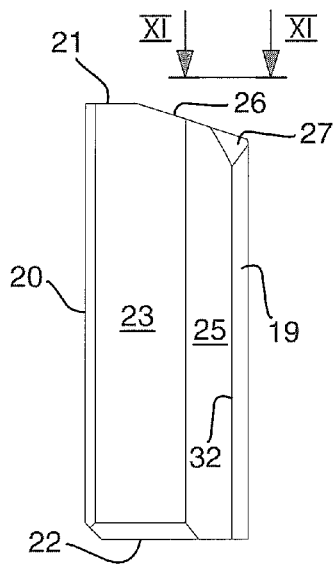
*Fig 6*  *Fig 7*
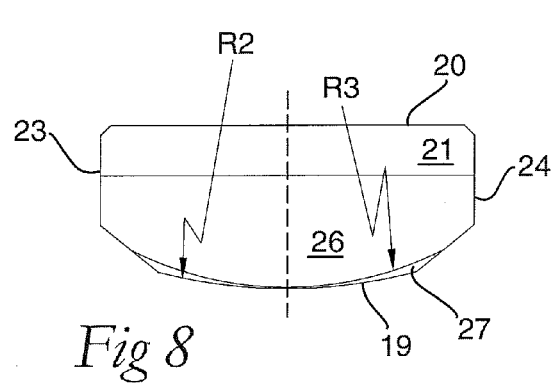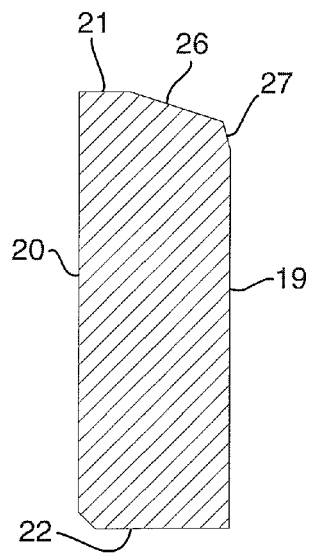
*Fig 8*  *Fig 9*

DRILL BODY AS WELL AS SUPPORT PAD THEREFOR

CROSS-REFERENCE TO PRIOR APPLICATION

This application claims priority to Sweden Application No. 0850157-9 filed Dec. 19, 2008, which is incorporated by reference herein.

FIELD OF THE INVENTION

The present invention relates to a drill body intended for the machining of holes in workpieces of metal and of the type that comprises a drill body having front and rear ends between which an axis extends through and a peripheral cutting insert arranged in the front end, as well as a support pad that projects radially in relation to the outer surface of the cutting insert.

BACKGROUND OF THE INVENTION

Drill bodies for cutting or chip removing machining may have the most varying design to be able to carry out efficient machining operations in workpieces of metal of varying type. Usual materials in which hole machining is effected are steel, cast iron, aluminium, titanium, stainless materials, as well as different types of composites. A frequently occurring machining method is solid drilling, which means that a hole is drilled in a solid material at a predetermined diameter in a single operation, while forming either a through hole having two openings or a blind hole having a bottom and only one opening. Such drilling may be carried out by means of short hole drills, the length of which usually amounts to at most 5×D, as well as long hole drills, the length of which may amount to 100×D or more. Another method is so-called reaming, wherein a pre-drilled pilot or center hole is imparted with the final hole diameter and optimum quality in respect of dimensional accuracy and surface smoothness.

While short hole drills usually have the cutting inserts and cutting edges thereof symmetrically placed and therefore are self-centering, long hole drills, above all of the type STS and EJECTOR that require internal chip evacuation, are made with asymmetrically placed cutting inserts, which makes self-centering impossible. More precisely, such drill bodies are, in the front end thereof, equipped with three cutting inserts, viz. a peripheral insert, a center insert and an intermediate insert, the two first-mentioned ones of which are placed adjacent to a first chip inlet and the last-mentioned one to a diametrically opposite, second chip inlet. The cutting inserts can be fixed either by soldering or by means of screw joints. Behind the two chip inlets, as viewed in the direction of rotation, support pads are mounted in the envelope surface of the drill body and project radially so much from the envelope surface that the radially outermost portion thereof will abut against the hole wall generated by the peripheral cutting insert, all with the purpose of centering the drill body during the axial feed thereof. Examples of long hole drills having such support pads are disclosed in U.S. Pat. No. 5,697,737, U.S. Pat. No. 6,602,028 B1 and U.S. Pat. No. 6,682,275 B1.

Also other drill bodies, e.g., for boring purposes, make use of support pads to center the drill body, such as are exemplified in U.S. Pat. No. 4,571,130, U.S. Pat. No. 4,596,498 and U.S. Pat. No. 5,551,812.

Generally, individual support pads for the above-mentioned purposes have a parallelepipedic (usually elongate) basic shape and consist of a hard-wearing material, such as cemented carbide, the support pads being delimited by a cross-sectionally convexly arched outer surface for abutment against the hole wall, an inner surface for pressing against a bottom of a mounting pocket in the drill body, front and rear end surfaces, as well as a pair of mutually parallel side surfaces. The outer surface, which also may be denominated contact surface, is generally cylindrical, although the same also may have an utmost slight conicity in the backward direction. To facilitate the entering of the support pad into the hole that has been initiated by those cutting inserts that enter the workpiece immediately before the support pad, between the outer surface and at least the front end surface, it is formed a so-called entering surface in the form of a conical surface that tapers in the forward direction. In addition, support pads of drill bodies for the drilling of through holes may be formed with such an entering surface also at the rear end thereof, more precisely to facilitate the return of the drill body through the hole. Furthermore, it should be mentioned that the radius of curvature of the convexly arched outer surface of most support pads is selected somewhat smaller than the radius of the hole that should be recessed, the contact between the hole wall and the support pad getting the form of an axial line contact somewhere along the outer surface. In such a way, the support pad may be used for drill bodies having different diameters contrary to support pads, the outer surface of which have a radius of curvature that coincides with the hole radius.

The present invention has its origin in problems that are associated with previously known support pads and the drill bodies to which these are applied. Thus, the shape of the entering surface of previously known support pads is geometrically determined by a truncated cone, the basal plane of which has the same radius as the radius of curvature of the cylindrical outer surface, at the same time as the cone and the cylinder are coaxial, i.e., generated along a common center axis to which the basal plane of the cone (and one end plane of the imaginary cylinder) is perpendicular. This means that the front and rear borderlines, which delimit the entering surface, become parallel to each other as viewed in planar view toward the outer surface of the support pad, at the same time as the two end borderlines of the entering surface form generatrices of the truncated cone. In practice, said geometry entails a plurality of disadvantages, one of which consists of the fact that the contact spot or contact line of the outer surface against the hole wall cannot be controlled or predetermined. When the rear borderline of the entering surface enters into the initiated hole, the contact point may accordingly end up on different spots along the rear borderline; something that may result in an impaired centering of the drill body and a mediocre hole quality in respect of dimensional accuracy and surface smoothness. Another disadvantage is that the two end borderlines of the entering surface form fairly sharp edges, which during the rotation of the drill body move in the same cone-shaped path of motion as the other generatrices along the entering surface. Therefore, the sharp edge that first (depending on the direction of rotation of the drill body) impinges on the hole edge may easily come to scrape against or dig into the same.

Most suitably, the outer surface as well as the entering surface obtain the final shape thereof by grinding when the support pad has been mounted on the drill body. To avoid the negative effects that the sharp end edges of the entering surface cause, it happens that these edges are finished. Such finishing may even be effected in a manual way, e.g., by honing or edge smoothing. However, such finishing makes the manufacture of the support pad, which is a mass-produced article that requires efficient series manufacturing to create economy, considerably dearer.

SUMMARY

The present invention aims at obviating the above-mentioned disadvantages of such drill bodies that are equipped with previously known support pads, and at providing an improved drill body, as well as an improved support pad and/or a support pad blank. Thus, a primary object of the invention is to provide a drill body equipped with at least one support pad that is constructed in such a way that the contact between the hole wall and the outer surface of the support pad can be predetermined in a controlled way. Furthermore, the two side borderlines of the entering surface should not be able to dig into the hole edge when the support pad enters the hole. An additional object is to provide a drill body, the individual support pad of which can be formed by means of a few, simple grinding operations without any after-treatment. Thus, it should be possible to grind the support pad in two simple machining operations, while obtaining the desired function, viz. by grinding the entering surface and the (cylindrical) outer surface being behind.

In one aspect of the invention, there is provided a drill body for the machining of holes in workpieces of metal, comprising front and rear ends between which an axis extends through, said drill body rotatable about said axis and with which a rotationally symmetrical envelope surface is concentric, a peripheral cutting insert arranged in the front end, and a support pad projecting radially beyond the envelope surface and comprises a cross-sectionally convexly arched outer surface having a rotationally symmetrical shape, an inner surface, front and rear end surfaces, as well as a pair of spaced-apart side surfaces, between the outer surface and at least the front end surface a convexly arched entering surface being formed that has a rotationally symmetrical shape and extends between a pair of tangentially spaced-apart front and rear borderlines, the entering surface being orientated in such a way that imaginary generatrices, which run forward from the rear borderline along the entering surface, point inward toward the rotation axis so as to facilitate the penetration of the support pad into a hole, the rear borderline bordering the outer surface and having a shape of a convex arc line as viewed in planar view toward the outer surface.

In another aspect of the invention, there is provided a support pad for metal machining drills, comprising a convexly arched outer surface having a rotationally symmetrical shape, an inner surface, front and rear end surfaces, a convexly arched entering surface with a rotationally symmetrical shape being formed between the outer surface and at least the front end surface, said entering surface extending between a pair of two tangentially spaced-apart front and rear borderlines, the rear borderline bordering the outer surface and has a shape of a convex arc line as viewed in planar view toward the outer surface.

BRIEF DESCRIPTION OF THE DRAWINGS

FIG. 1 is a perspective view of a drill body according to the invention, more precisely in the form of a front drill body of a long hole drill.

FIG. 2 is an analogous perspective view showing the drill body without cutting inserts and support pads.

FIG. 6 is a planar view of the support pad as viewed toward the outer surface thereof.

FIG. 7 is a side view of the support pad as viewed from the left in FIG. 6.

FIG. 8 is an end view of the support pad as viewed from above in FIG. 6.

FIG. 9 is a longitudinal section IX-IX in FIG. 6.

DETAILED DESCRIPTION OF THE PREFERRED EMBODIMENTS

Figure 3:
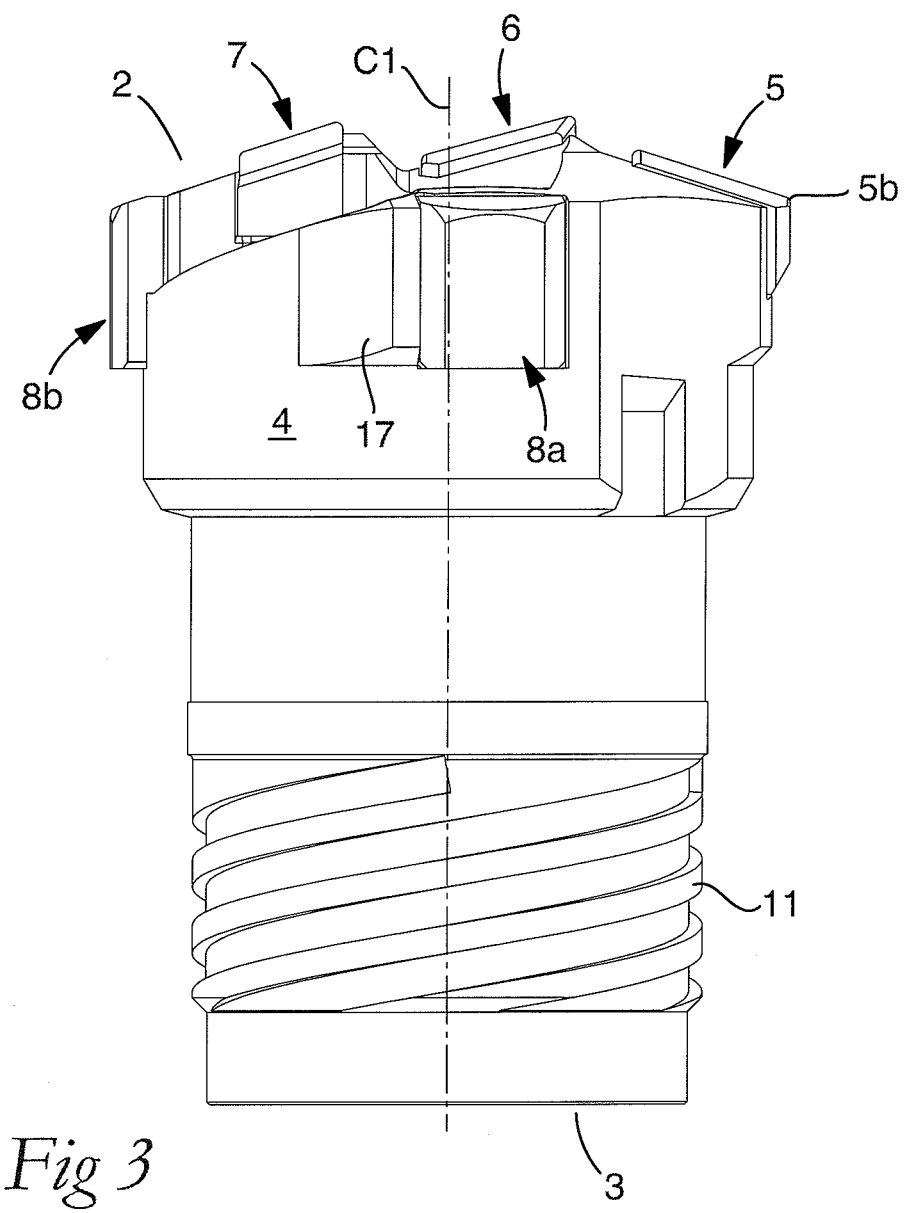
FIG. 3 is a side view of the drill body according to FIG. 1.

In FIG. 1, a drill body 1 is shown of the type that is intended to be coupled together with the front end of a tube (not shown) in order to form, together with the tube, a usable long hole drill. Between front and rear ends 2, 3, an axis C1 extends through and around which the drill body 1 is rotatable and with which a rotationally symmetrical envelope surface 4 is concentric. This surface 4 may be cylindrical or alternatively have an utmost slightly conical shape, which tapers in the backward direction. In the front end 2, three cutting inserts are mounted, viz. a peripheral insert 5, a center insert 6, and an intermediate insert 7, which are placed adjacent to two chip inlets 9a, 9b, which communicate with a common chip flute in the form of a through hollow space (lacks reference designation) inside a sleeve-like, rear portion 10 of the drill body. More precisely, the peripheral insert 5 and the center insert 6 are mutually placed adjacent to the first chip inlet 9a, while the intermediate insert 7 is placed adjacent to the second chip inlet 9b. In a conventional way, the intermediate insert 7 has the purpose of removing the ring-shaped material ridge that is left by the gap between the peripheral and center inserts 5, 6. As is clearly seen in FIG. 1, a male thread 11 is formed outer surface the rear portion of the drill body to be tightened in a corresponding female thread of the drill tube.

In addition to the cutting inserts 5, 6, 7, two support pads are mounted in the vicinity of the front end 2 of the drill body and that in this case are identical and therefore mutually designated 8, although the same are distinguished in respect of the location thereof by means of the suffixes a and b. As is seen in FIG. 2, the support pads are mounted in a pocket 12a, 12b each, which includes a plane bottom surface 13, an axially rear support surface 14, as well as two tangentially spaced-apart surfaces 15, 16, one of which, viz. the surface 15 situated behind the bottom surface 13 as viewed in the direction of rotation R of the drill body, has contact with the support pad to serve as a side support surface for the same. However, the support pad has normally not contact with the surface 16. As is further seen in FIG. 2, the cutting inserts 5, 6, 7 are mounted in similar pockets or seatings 51, 61, 71, which individually are defined by a bottom surface, an axially rear support surface, as well as two side limiting surfaces, which lack reference designations, since the cutting inserts and the fixation thereof are incidental to the invention. However, it should be noted that the cutting inserts as well as the support pads in this case are fixed in appurtenant pockets by soldering in a suitable number of interfaces. Thus, the individual support pad 8 is connected by soldering to at least the bottom surface 13 and the side support surface 15, and suitably also to the rear support surface 14, but not to the side surface 16. In this connection, it should also be noted that the side support surface 15 positioned rotationally behind the support pad is wider than the surface 16 by being made as a front surface of a lip 17 being (rotationally) behind.

Figure 4:
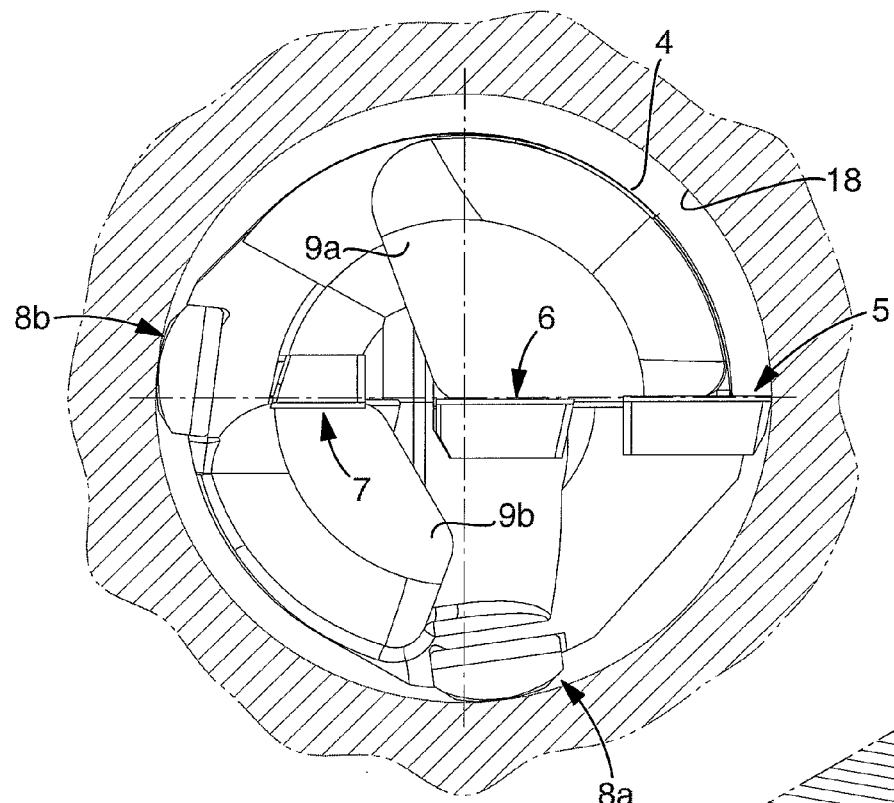
FIG. 4 is an end view of the same drill body surrounded by a hole wall.

In FIGS. 3 and 4, it is seen how not only the peripheral portion of the individual support pad, but also the outermost corner 5b of the peripheral cutting insert 5 projects radially in relation to the envelope surface 4 of the drill body. In FIG. 4, numeral 18 designates the hole that the drill body has the task of creating in a workpiece. The diameter or the radius of this hole 18 is determined by the radial distance between the rotation axis C1 and the outermost corner 5b of the peripheral cutting insert 5. In order for the individual support pad 8 to guide the drill body in the desired way in the hole, the outermost portion of the support pad, which is in contact with the hole wall, should be situated at the same radial distance from the rotation axis C1 as the corner 5b of the peripheral cutting insert. In FIG. 3, it is furthermore seen that each one of the support pads 8a, 8b are situated axially behind the cutting inserts 5, 6, 7. This means that the cutting inserts have time to initiate the hole somewhat before the support pads enter the same (in this connection, it should be pointed out that the drill body initially is guided and centered by means of a particular bushing until the support pads reliably have come into working order).

It should also be mentioned that the experts in the field at times use different denominations for the two support pads. Thus, the pad 8a positioned rotationally behind the peripheral and center inserts 5, 6 is often called "bearing pad", while the other pad 8b is called "guide pad". The reason for this is that the pad 8a is subjected to greater stresses than the pad 8b by being situated behind the two cutting inserts 5, 6 subjected to the greatest cutting forces, while the pad 8b is situated approximately radially outer surface the moderately loaded intermediate insert 7 and therefore fulfils a guiding function rather than a bearing one. In FIG. 4, it is furthermore seen that the two support pads are mounted in different positions, viz. so far that the bottoms 13 of the pockets 12a, 12b shown in FIG. 2 form different angles with imaginary radii that extend inward to the rotation axis C1. Therefore, in practice, the contact against the hole wall will be established at different spots along the outer surfaces of the respective support pads. Also, it should be noted that the radius of curvature of the convex outer surface or contact surface 19 of the support pads is smaller than the radius of the hole 18.

Reference is now made to FIGS. 5-12, which more in detail illustrate the nature of the support pad 8. Usually, the manufacture of the support pad is carried out by the pressing and sintering of a powder mass, while forming a cemented carbide body that suitably has a parallelepipedic basic shape (the support pad may also be manufactured from other wear resistant materials than cemented carbide). Geometrically, the body is delimited by an outer surface 19, an opposite inner surface 20, front and rear end surfaces 21 and 22, respectively, as well as a pair of side surfaces 23, 24, which in this case are plane and mutually parallel. The outer surface 19, which forms the contact surface of the support pad against the hole wall, is convexly arched, while the opposite inner surface 20 in this case is a plane surface. Theoretically, the outer surface 19 may have a cylindrical shape, but in practice a slightly conical shape is preferred, more precisely a cone-shape that converges in the rearward direction. However, this conicity is so small that it cannot be seen by the naked eye. Between the arched outer surface 19 and the side surfaces 23, 24, there are chamfered, plane surfaces 25, which form an obtuse angle with the side surfaces 23, 24, which in turn form a right angle with the plane inner surface 20. In addition, in this case there is a front, plane chamfer surface 26 adjacent to the front end surface 21. Also the surfaces 21, 26 form an obtuse angle with each other. In the body shown there is furthermore included an entering surface 27 that in a conventional way has the purpose of facilitating the insertion of the support pad into the recessed hole.

As far the shown drill body and the support pads thereof hitherto have been described, the same is in all essentials previously known. However, as has been pointed out by way of introduction, the entering surface of the previously known support pads is genuinely conical and concentric with the rotationally symmetrical surface that determines the arched shape of the outer surface. The disadvantages hereby is that the position of the contact point or contact line of the outer surface against the hole wall cannot be controlled, and that the two tangentially spaced-apart ends of the entering surface form sharp edges, which may dig into the hole edge.

To obviate the above-mentioned disadvantages, the entering surface 27 has, in accordance with the invention, been given such a shape and location that the rear borderline 29 thereof obtains a convex shape as viewed in planar view toward the outer surface of the support pad (see FIG. 6), more precisely with the crest of the arc line facing forward. Advantageously, the convex arc line 29 is provided by the fact that, on one hand, a primary center axis, around which the outer surface of the support pad is rotationally symmetrical, and, on the other hand, a secondary center axis, around which the entering surface is rotationally symmetrical, are dislocated in relation to each other. This dislocation of the primary and secondary, respectively, center axes of the surfaces may in practice be realized in various ways, as will be described in more detail, reference being made to FIGS. 12-16.

Figure 13:
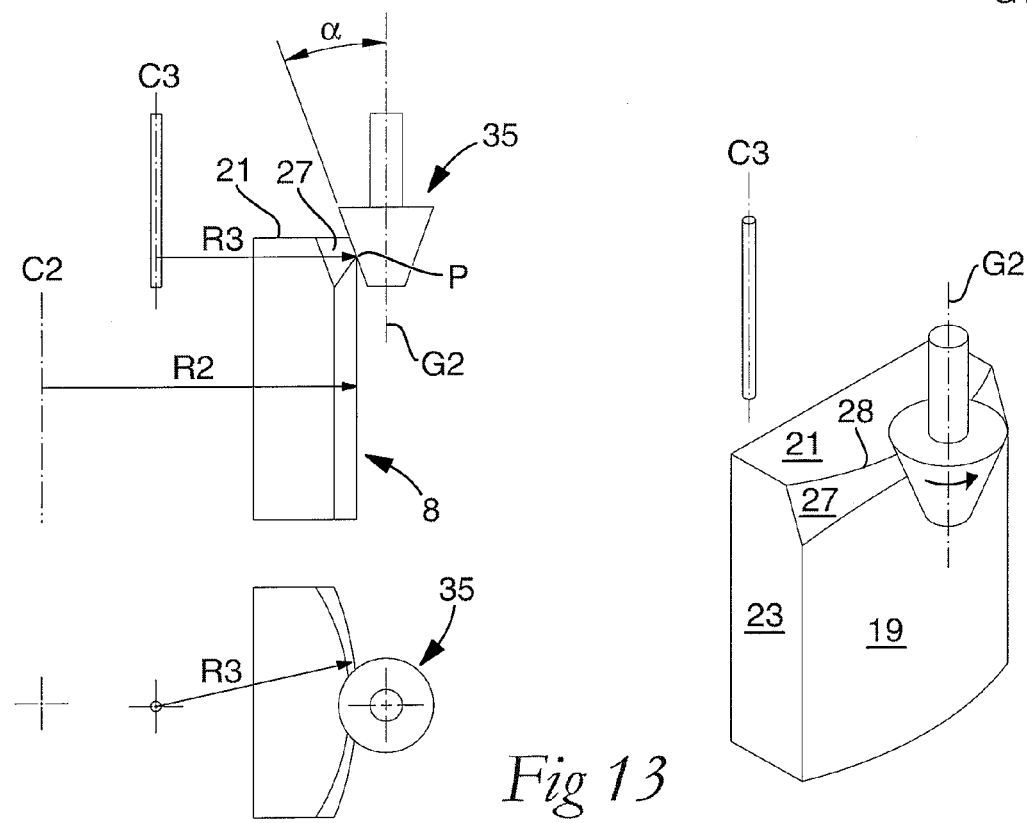
FIG. 13 is an analogous series of pictures showing how a first embodiment of the entering surface of the support pad is provided by means of a grinding body.

In a preferred embodiment, the dislocation may be realized by the entering surface per se being given a conical shape, but where the secondary center axis, with which the cone is concentric, is located eccentrically in relation to the primary center axis, with which a rotationally symmetrical outer surface of the support pad is concentric, at the same time as the basal plane of the cone is given a radius that is smaller than the radius of curvature of the outer surface (see FIG. 13). In the second alternative embodiment, the desired dislocation (see FIG. 15) is provided by giving the entering surface a cylindrical shape, which is represented by a geometrical cylinder that is concentric with a secondary center axis, which forms an acute angle β with the primary center axis with which the outer surface of the support pad is concentric.

In FIGS. 5-11, it is shown how the entering surface 27 is delimited by, on one hand, front and rear borderlines 28 and 29, respectively, and on the other hand two tangentially spaced-apart side borderlines 30, 31. Of these, the rear borderline 29 is connected to the convex outer surface 19 and the front borderline 28—in this case—to the front, plane chamfer surface 26. The side borderlines 30, 31 form the borders of the entering surface 27 to the two chamfer surfaces 25 along the side surfaces of the pad. For the sake of completeness, it should also be pointed out that the outer surface 19 is delimited from the chamfer surfaces 25 via straight borderlines 32, which run from the points 33 where a side borderline 30, 31 meets an individual end of the borderline 29.

The exact, final shape of the critical surfaces of the support pad according to the invention, viz. the convex outer surface 19 and the convex entering surface 27, is suitably obtained by grinding when the support pad has been fixed to the drill body. In the example, this fixing is carried out by soldering. To illustrate the design of the finish-ground support pad, reference is now made to the schematic pictures in FIGS. 12-14, in which 34 and 35, respectively, designate two rotatable grinding bodies, which in the example are assumed to be rotatable around their own center axes, the grinding surface being a rotationally symmetrical surface (cylindrical and conical, respectively). To grind the convex outer surface 19 according to FIG. 12, the grinding body 34 and the envelope surface thereof are brought to move in a circular path CP2 (see also FIG. 14), the center of which is represented by a primary center axis C2, which is parallel to the length extension of the outer surface 19 (in the example also to the plane inner surface 20). In this connection, the radial distance between the center axis C2 and the envelope surface, i.e., the grinding surface of the grinding body 34, is designated R2. Furthermore, it is assumed that the rotation axis G1 of the grinding body 34 in this case is parallel to the center axis C2, and hence the convex outer surface 19, which is generated on the support pad, obtains a cylindrical shape (if it is desirable to create a cone-shape slightly tapering in the backward direction along the support pad, the rotation axis G1 of the grinding body and the primary center axis C2 can be tilted some minute or second in relation to each other).

In FIG. 13, it is shown how the entering surface 27 is generated by grinding in the area between, on one hand, the cylinder surface 19, and, on the other hand, the front end surface 21 of the support pad (and in this case also the chamfer surface 26 adjacent to the end surface). Also here, a rotatable grinding body 35 is used, which is exemplified as having a conical shape, and which is brought to move in a circular path of motion CP3 around a center in the form of a center axis C3. However, in this case, the radius R3 of the circle CP3, more precisely the radial distance between the center axis C3 and a point P along the envelope surface of the grinding body 35, is smaller than the radius R2. In other words, the point P along the envelope surface of the rotating grinding body will move in a circle that is smaller than the circle in which the envelope surface of the grinding body 34 moves. In the example shown, the conicity of the grinding body 35 determines the conicity that is imparted to the entering surface 27. More precisely, the conicity of the entering surface 27 is determined by the angle α between a generatrix along the grinding body 35 and the outer surface 19, and the axis C3, respectively. In this connection, it should be pointed out that the grinding body also could have a cylindrical shape and be tilted at a suitable angle in relation to the axis C3 to give the desired cone angle.

Figure 5:
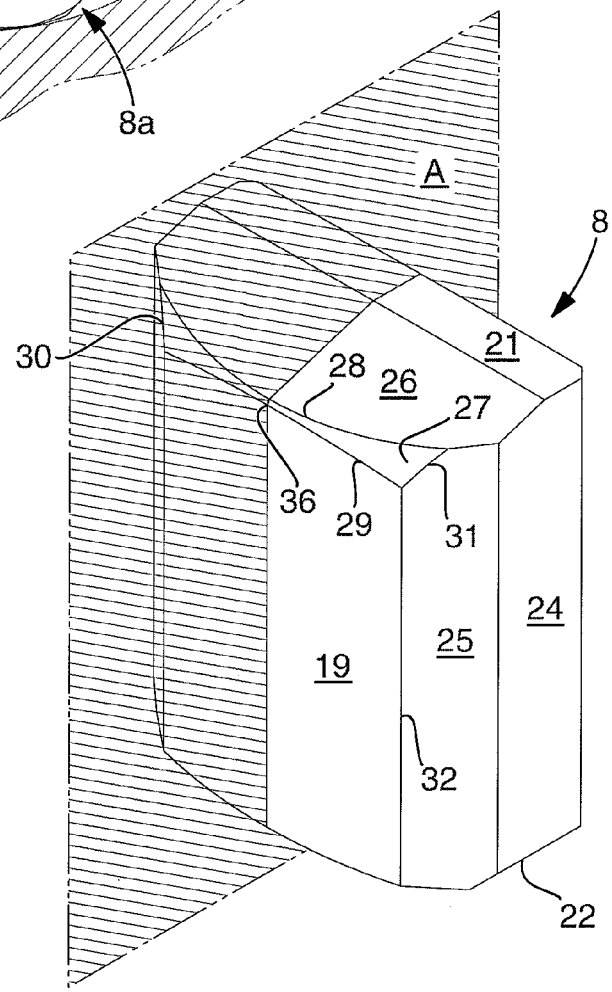
FIG. 5 is an enlarged perspective view of a support pad included in the drill body.
Figure 10:
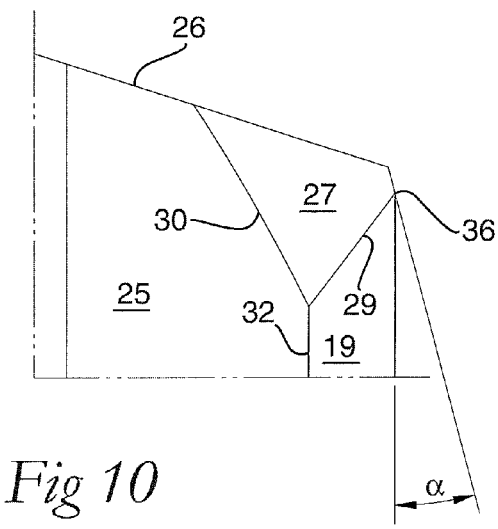
FIG. 10 is an enlarged, partial detailed side view X-X in FIG. 6.
Figure 11:
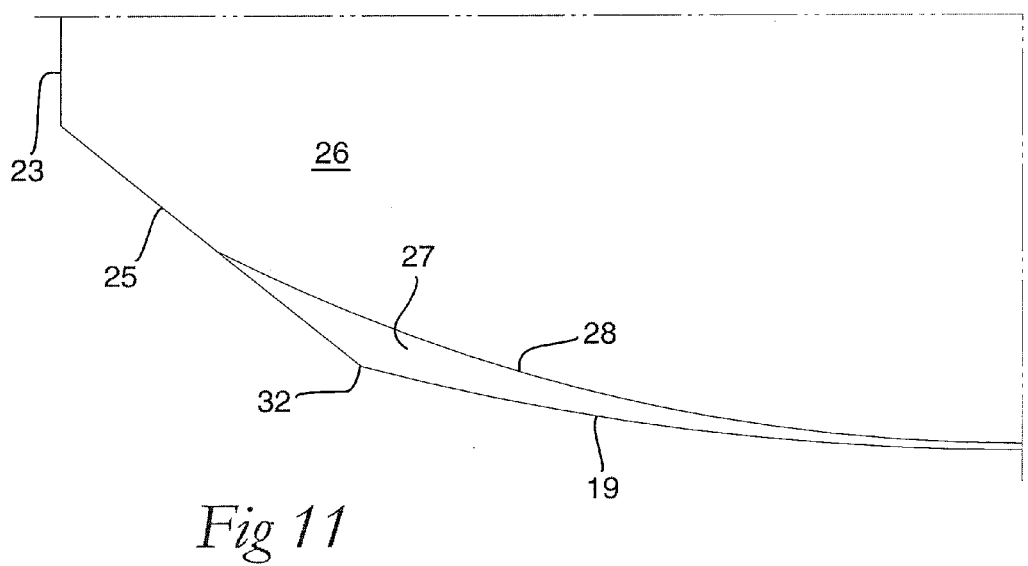
FIG. 11 is an analogous, vertical detailed view XI-XI in FIG. 7.

When the grinding body 35 is brought to move in the above-mentioned way, the rear borderline 29 of the interface 27 will get the arc-shape shown in FIGS. 5 and 6 and characterized by the crest or front point 36 of the arc line being directed forward. Because the two centers of the circles CP2, CP3 in the form of the center axes C2, C3 are situated in a common axial plane A (see FIG. 14), which intersects the cylindrical surface 19 in a section halfway between the side surfaces 23, 24, said crest 36 will be centrally located, i.e., halfway between the side borderlines 30, 31. In other words, the surfaces 19 and 27 may be said to be symmetrically located in relation to the axial plane A (see also FIG. 5).

Figure 12:
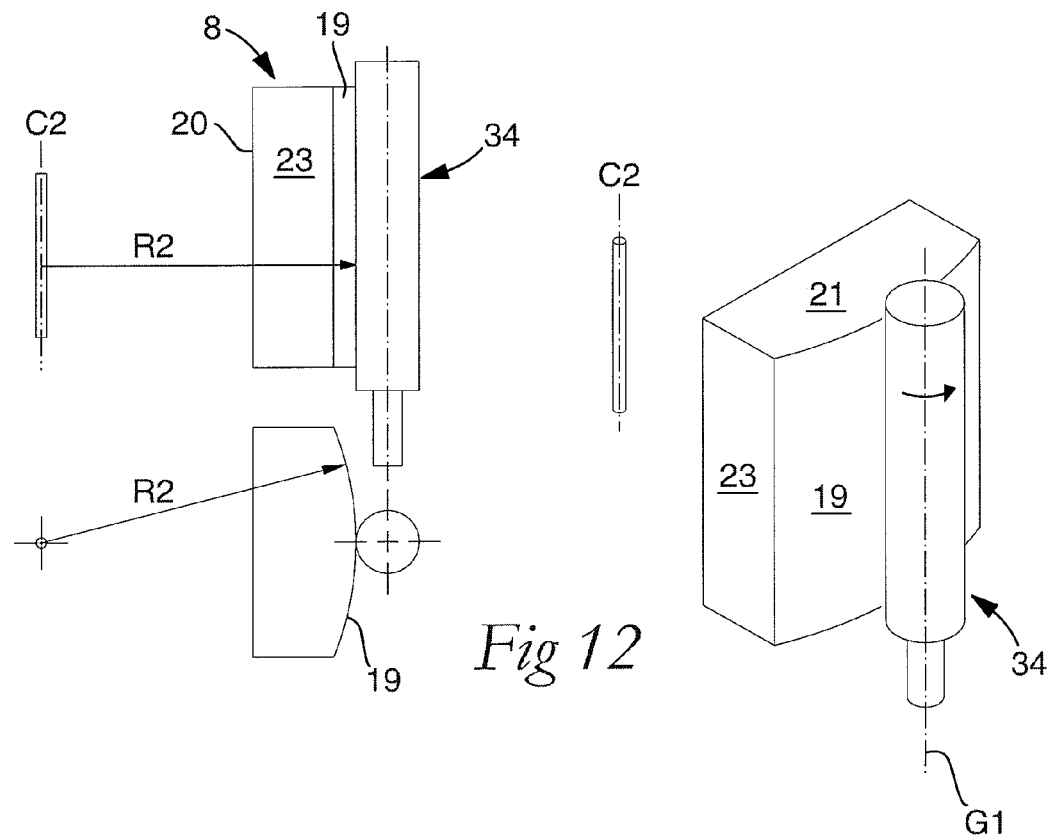
FIG. 12 is a series of pictures schematically illustrating the geometrical conditions that apply for the grinding of the outer surface of the support pad, and that define the shape thereof.
Figure 14:
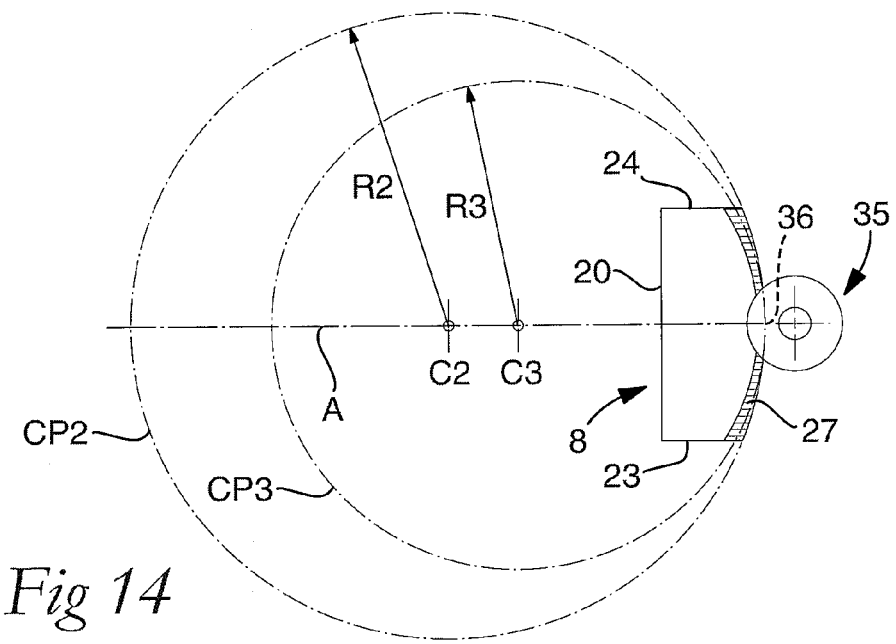
FIG. 14 is a schematic planar view showing how the grinding body shown in FIG. 13 moves during formation of the entering surface.
Figure 15:
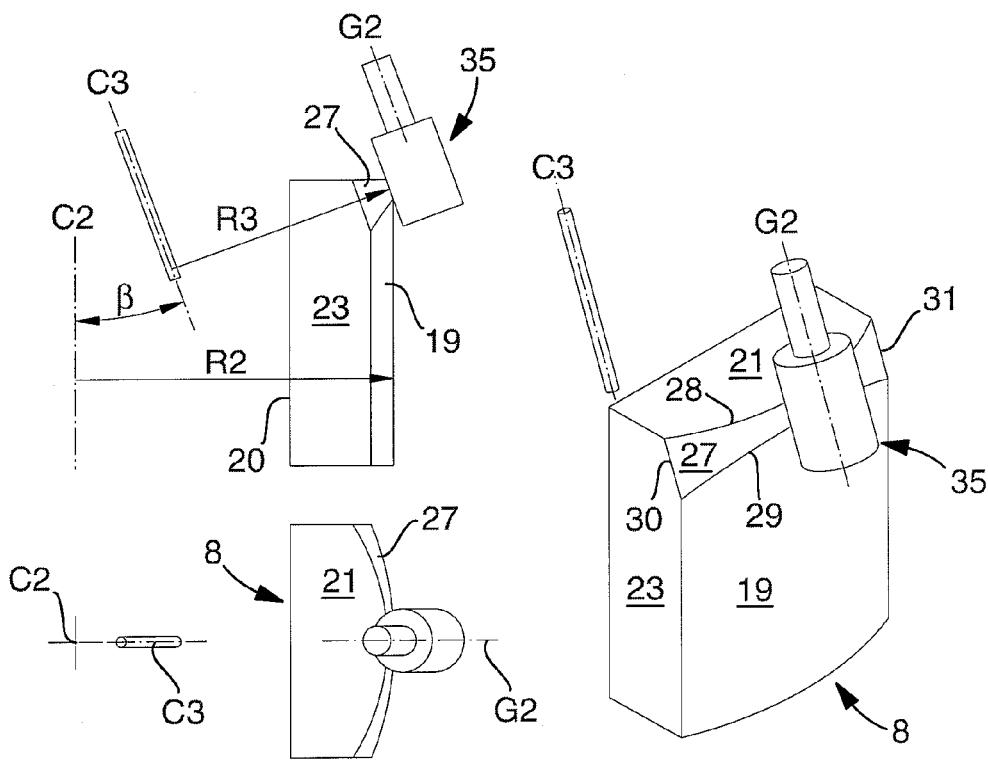
FIG. 15 is a series of pictures corresponding to FIG. 13 showing how an alternative embodiment of the entering surface of the support pad is ground.

Reference is now made to FIG. 15, which illustrates how the primary and secondary axes of the surfaces 19, 27 are dislocated in another way than in FIGS. 12-14 (where the axes C2, C3 are eccentric in relation to each other and where the greatest radius of curvature R3 of the cone surface 27 is smaller than the radius of curvature R2 of the cylinder surface). Thus, characteristic of the dislocation according to FIG. 15 is that, on one hand, the grinding surface of the grinding body 35, such as this is represented by a generatrix along a cylinder having the center axis G2, and, on the other hand, the secondary center axis C3 around which the grinding body is brought to describe a circular path, are mutually parallel and tilted at an angle β in relation to the primary center axis C2 of the outer surface 19. Also in this case, the radius R3 may—but does not need to—be smaller than the corresponding radius R2 of the cylindrical outer surface 19, whereby the entering surface 27 generated by the grinding body 35 obtains a cylindrical shape. For example, the entering surface of the support pad has the greatest radius of curvature that amounts to at most 80% of the radius of curvature of the outer surface or the entering surface of the support pad has the greatest radius of curvature that amounts to at least 50% of the radius of curvature of the outer surface. However, as a consequence of the grinding surface of the grinding body being tilted at the angle β in relation to the length extension of the outer surface 19, the rear borderline 29 of the entering surface 27 will also in this case be arched with its crest facing forward toward the end surface 21 of the support pad.

In this connection, it should be pointed out that the support pad 8 is shown in a simplified, schematic state in FIGS. 12-15, more precisely without the chamfer surfaces 25, 26 according to FIGS. 5-11. From FIGS. 12-15, it is, however, realized that said chamfer surfaces in practice could be spared, whereby the entering surface 27 will directly adjoin the front end surface 21 of the support pad via the front borderline 28, as well as the side surfaces 23, 24 via the end borderlines 30, 31 (which in planar view will be seen in the extension of the side surfaces 23, 24 without diverging mutually).

As has been pointed out above, the crest 36 of the arched rear borderline 29 is centrically situated (see FIGS. 5 and 6) when the entering surface 27 is ground according to FIG. 14, i.e., with the center axes C2, C3 commonly situated in the axial plane A.

Figure 16:
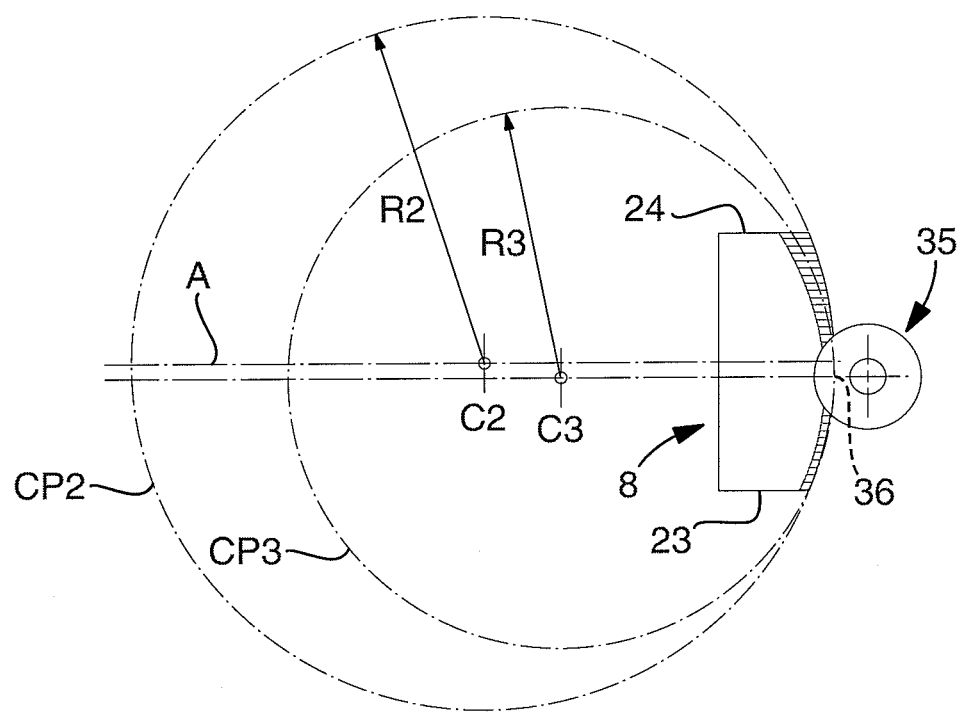
FIG. 16 is a schematic planar view illustrating the grinding of an additional alternative embodiment of the support pad according to the invention.

In FIG. 16, it is shown how the crest 36 of the arc line by simple means may also be laterally displaced and located in other desired spots between the two side surfaces 23, 24 of the support pad. Thus, this lateral displacement of the crest 36 may be provided by the center axis C3 of the path of motion of the grinding body 35 being displaced laterally in relation to the axial plane A in which the center axis C2 of the grinding body 34 (see FIG. 14) is situated. Therefore, by means of the invention, the lateral position of the crest 36 can be selected in a predetermined way.

In FIGS. 12-16, the schematically shown grinding bodies are exemplified as rotationally symmetrical bodies, the envelope surfaces of which are grinding surfaces. However, in practice, other types of grinding bodies may also be used, e.g., discs, the plane surfaces of which serve as grinding surfaces. In such cases, the measures and angles described above are related to the plane grinding surface of the disc instead of to the generatrices of a cylinder and a cone, respectively.

When the individual support pad 8 of the drill body 1 enters the drill hole 18 initiated by the cutting inserts 5, 6, 7, the crest 36 along the rear, arched borderline 29 of the entering surface 27 will first enter into the hole and establish the contact of the support pad with the hole wall, i.e., before the rest of the same borderline enters. This contact is made up of a point or line contact along the crest 36. Therefore, a fundamental advantage of the invention is that the designer can, in a controlled way, predetermine exactly where the support pad should contact the hole wall. In the example according to FIGS. 5-15, a contact via a central crest 36 is preferred. However, in the embodiment according to FIG. 16, an asymmetrical location of the contact spot is preferred by the crest 36 of the borderline 29 having been displaced toward the side edge surface 23. In this connection, it should be pointed out that said lateral displacement of the crest 36, and thereby the contact spot, can be provided irrespective of whether the support pad is ground according to the method illustrated in FIGS. 12-14, or the method shown in FIG. 15.

Another vital advantage of the invention is that the two tangentially spaced-apart side borderlines of the entering surface cannot get in contact with the edge of a hole in connection with the entering of the support pad into the same. Thus, the individual side borderline will, during drilling, rotate in a cone-shaped path situated inner surface (i.e., closer to the rotation axis of the drill than) the cone-shaped path in which a generatrix situated axially in front of the crest of the rear borderline rotates. In other words, it is not risked that the rotationally front end borderline digs or scrapes into the hole edge.

It should be pointed out that the invention results in the above-mentioned advantages by means of the simple measure of, instead of grinding the entering surface and the outer surface or the contact surface, respectively, around a single common axis, dislocating a primary axis of the cylindrical outer surface from a secondary axis of the entering surface, either in the way shown in FIGS. 12-14, or in the way shown in FIG. 15, while the rear borderline of the entering surface is imparted an arc-shape having a crest, the position of which may be selected freely in a predetermined way.

It should also be pointed out that the support pad according to the invention as such may be commercialized in two different ways, viz. in a finish ground state, as well as in an unground state. In the last-mentioned case, the support pad constitutes a pre-formed blank having a certain grinding allowance, and a shape which closely agrees with the shape obtained after the fixation of the support pad on the drill body and the subsequent grinding of the surfaces 19, 27. By pre-forming the support pad with a moderate grinding allowance, the advantage is gained that the requisite grinding depth becomes very moderate, whereby the final grinding of the vital surfaces 19, 27 on the support pad fixed to the drill body can be carried out extremely fast and efficiently in a series manufacturing procedure.

The invention is not limited only to the embodiments described above and shown in the drawings. Thus, the invention is also applicable to other drill bodies than just those intended for long hole drills, e.g., boring tools of the type that are exemplified in the above-mentioned U.S. Pat. No. 4,571,130. Furthermore, the support pads and/or the cutting inserts can be fixed to the drill body in another way than by soldering, e.g., by means of screw joints (see e.g., U.S. Pat. No. 5,697,737). For instance, the inner surfaces and outer surfaces of the support pad do not need to run essentially parallel to each other, but may be considerably inclined in relation to each other, the receiving pockets in the drill body being given a modified shape in an analogous way. In a future, when the technique of pressing and sintering cemented carbide bodies maybe has been further refined, it is even feasible to impart the support pad with the described design without needing to grind the same.

Although the present invention has been described in connection with preferred embodiments thereof, it will be appreciated by those skilled in the art that additions, deletions, modifications, and substitutions not specifically described may be made without department from the spirit and scope of the invention as defined in the appended claims.

The invention claimed is:

1. A drill body for the machining of holes in workpieces of metal, comprising:

front and rear ends between which an axis extends through, said drill body rotatable about said axis and with which a rotationally symmetrical envelope surface is concentric;

a peripheral cutting insert arranged in the front end; and a support pad projecting radially beyond the envelope surface and comprises a cross-sectionally convexly arched outer surface having a rotationally symmetrical shape, an inner surface, front and rear end surfaces, as well as a pair of spaced-apart side surfaces, between the outer surface and at least the front end surface a convexly arched entering surface being formed that has a rotationally symmetrical shape and extends between a pair of tangentially spaced-apart front and rear borderlines, the entering surface being orientated in such a way that imaginary generatrices, which run forward from the rear borderline along the entering surface, point inward toward the rotation axis so as to facilitate the penetration of the support pad into a hole, the rear borderline separating the outer surface from the entering surface and having a shape of a convex arc line as viewed in planar view toward the outer surface.

2. The drill body according to claim 1, wherein a primary center axis, around which the outer surface of the support pad is rotationally symmetrical, and a secondary center axis, around which the entering surface is rotationally symmetrical, are dislocated in relation to each other to give the arc line the convex shape thereof.

3. The drill body according to claim 1, wherein the entering surface of the support pad has a conical shape that is concentric with a secondary center axis, which is parallel to, although eccentric in relation to the primary center axis with which the outer surface is concentric, a greatest radius of curvature of the entering surface being smaller than a radius of curvature of the outer surface.

4. The drill body according to claim 3, wherein the entering surface of the support pad has the greatest radius of curvature that amounts to at most 80% of the radius of curvature of the outer surface.

5. The drill body according to claim 3, wherein the entering surface of the support pad has the greatest radius of curvature that amounts to at least 50% of the radius of curvature of the outer surface.

6. The drill body according to claim 1, wherein a crest of the arched rear borderline is situated halfway between the two side surfaces of the support pad as a consequence of the center axes of the outer surface as well as of the entering surface being commonly situated in an axial plane, which extends from the primary center axis and intersects the outer surface halfway between the two side surfaces of the support pad.

7. The drill body according to claim 1, wherein a crest of the arched rear borderline is situated closer to one of the two side surfaces of the support pad than the other one as a consequence of the secondary center axis of the entering surface being situated beside an axial plane, which extends from the primary center axis and intersects the outer surface halfway between the two side surfaces of the support pad.

8. The drill body according to claim 1, wherein the entering surface of the support pad has a cylindrical shape and is concentric with a secondary center axis, which forms an acute angle ($\beta$) with the primary center axis with which the outer surface is concentric.

9. The drill body according to claim 1, wherein, between the outer surface and each one of the two side surfaces of the support pad, chamfer surfaces are formed, which border the entering surface via said side borderlines, the latter diverging from the rear borderline of the entering surface toward the front one, as viewed in planar view toward the outer surface of the support pad.

10. The drill body according to claim 1, wherein imaginary generatrices along the entering surface have a greatest length thereof in the vicinity of the two side borderlines.

11. The drill body according to claim 1, wherein the outer surface and entering surface of the support pad are formed by grinding in two solitary operations after the mounting of the support pad in the drill body.

12. A support pad for metal machining drills, comprising: a convexly arched outer surface having a rotationally symmetrical shape, an inner surface, front and rear end surfaces, a convexly arched entering surface with a rotationally symmetrical shape being formed between the outer surface and at least the front end surface, said entering surface extending between a pair of two tangentially spaced-apart front and rear borderlines, the rear borderline separating the outer surface from the entering surface and has a shape of a convex arc line as viewed in planar view toward the outer surface.

13. The support pad according to claim 12, wherein a primary center axis, around which the outer surface of the support pad is rotationally symmetrical, and a secondary center axis, around which the entering surface is rotationally symmetrical, are dislocated in relation to each other to give the arc line the convex shape thereof.

14. The support pad according to claim 12, wherein the entering surface has a conical shape that is concentric with a secondary center axis, which is parallel to, although eccentric in relation to the primary center axis with which the outer surface is concentric, a greatest radius of curvature of the entering surface being smaller than a radius of curvature of the outer surface.

15. The support pad according to claim 14, wherein the entering surface has the greatest radius of curvature that amounts to at most 80% of the radius of curvature of the outer surface.

16. The support pad according to claim 14, wherein the entering surface has the greatest radius of curvature that amounts to at least 50% of the radius of curvature of the outer surface.

17. The support pad according to claim 12, wherein a crest of the arched rear borderline is situated halfway between the two side surfaces of the support pad as a consequence of the center axes (R2, R3) of the outer surface as well as of the entering surface being commonly situated in an axial plane (A), which extends from the primary center axis and intersects the outer surface halfway between the two side surfaces.

18. The support pad according to claim 12, wherein a crest of the arched rear borderline is situated closer to one of the two side surfaces of the support pad than the other one as a consequence of the secondary center axis of the entering surface being situated beside an axial plane, which extends from the primary center axis and intersects the outer surface halfway between the two side surfaces.

19. The support pad according to claim 12, wherein the entering surface has a cylindrical shape and is concentric with a secondary center axis, which forms an acute angle ($\beta$) with the primary center axis with which the outer surface is concentric.

20. The support pad according to claim 12, wherein, between the outer surface and each one of the two side surfaces, chamfer surfaces are formed, which border the entering surface via said side borderlines, the latter diverging from the rear borderline of the entering surface toward the front one.

21. The support pad according to claim 12, wherein imaginary generatrices along the entering surface have a greatest length thereof in the vicinity of the two side borderlines.

22. The support pad according to claim 12, wherein the support pad is a pre-formed blank the outer surface and entering surface of which are unground.

* * * * *